United States Patent [19]
Frandsen, Sr.

[11] Patent Number: 5,875,943
[45] Date of Patent: Mar. 2, 1999

[54] TRUNK CADDIE

[76] Inventor: Donald L. Frandsen, Sr., 2901 Dexter Dr., Elkhart, Ind. 46515

[21] Appl. No.: 876,364

[22] Filed: Jun. 16, 1997

[51] Int. Cl.$^6$ ..................................................... B60R 7/00
[52] U.S. Cl. ...................... 224/42.33; 224/274; 224/571; 224/901; 248/96; 211/85.7
[58] Field of Search .............................. 224/274, 42.32, 224/42.33, 901, 537, 571; 206/315.7, 523, 591, 587; 248/96, 634, 346.03, 346.01, 205.3, 688; 211/60.1, 59.4, 85.15, 85.7

[56] References Cited

U.S. PATENT DOCUMENTS

| | | | |
|---|---|---|---|
| 3,476,257 | 11/1969 | O'Connell | 248/205.3 |
| 4,016,983 | 4/1977 | Dadisman | 248/351 |
| 4,681,234 | 7/1987 | Wisniewski | 211/70.6 |
| 5,088,635 | 2/1992 | Taylor et al. | 224/274 |
| 5,333,829 | 8/1994 | Bell et al. | 248/634 |
| 5,452,773 | 9/1995 | Hrupica | 224/275 |
| 5,497,891 | 3/1996 | Hannon | 248/96 |
| 5,575,413 | 11/1996 | Starry | 224/274 |

*Primary Examiner*—Linda J. Sholl
*Attorney, Agent, or Firm*—Watson Cole Grindle Watson, P.L.L.C.

[57] ABSTRACT

A trunk caddie is provided as a block of resilient yet firm material adapted to rest on the bed of a car trunk. The block has at least one arcuate depression therein that slopes across the width of the block, so that a golf bag cradled in the depression will have its heel in contact with the bed and its mouth elevated therefrom.

18 Claims, 2 Drawing Sheets

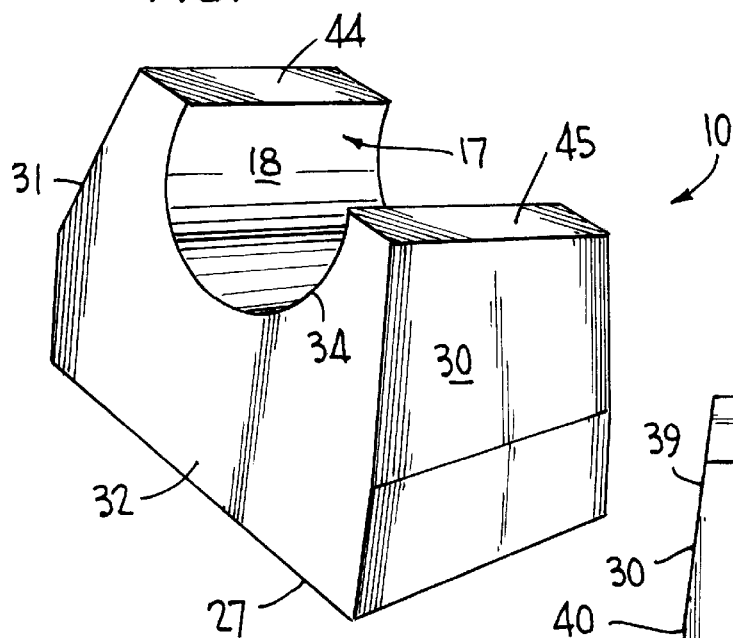
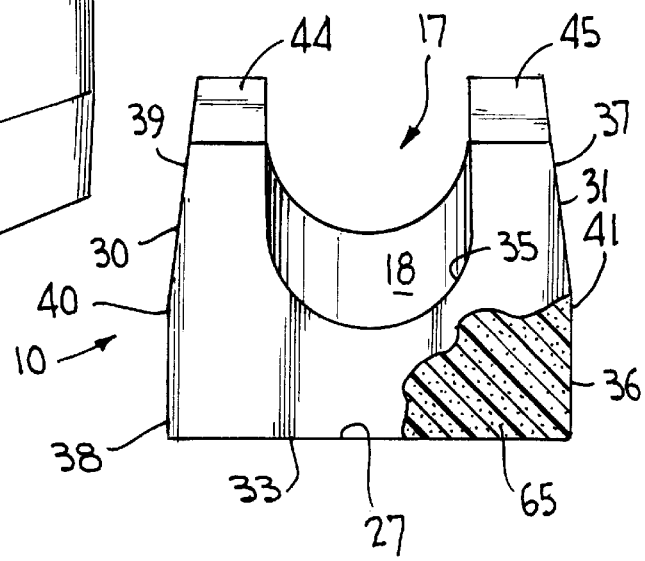
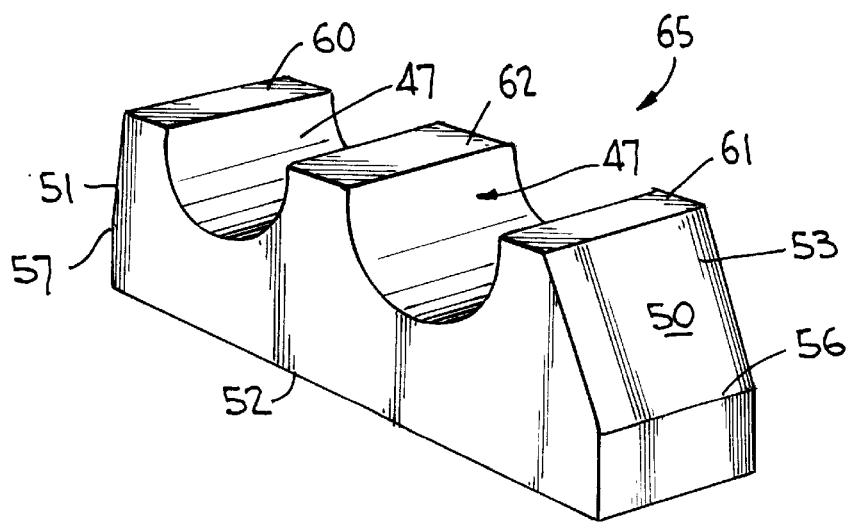

TRUNK CADDIE

BACKGROUND OF THE INVENTION

1. Field of the Invention

The present invention relates generally to transport means for holding an article that is composed of several parts which is to be moved from one location to another without substantial removal of those individual parts from their related position. More specifically, it relates to a caddie for holding and containing a golf club bag when that bag is being transported, e.g., from the home of a golfer to the golf course.

2. Description of the Prior Art

There are, of course, many devices outstanding for holding a golf bag filled with its assorted clubs in an upright position between uses of the bag. Thus, there are racks employing springs that hold the golf bag in a substantially vertical position until it is ready to be used, whereupon the springs are opened to permit egress of the bag. However, to the best of the present inventor's knowledge, such devices have not been used to hold the bag in an inclined position during transport thereof, wherein the bag is not maintained in a substantially upright position. Other devices are readily available, e.g., straps whereby a golf bag is held in upright position on a golf cart as the golfers and cart move about the holes of the golf course. However, once again, the bags are so maintained in a substantially vertical position.

It will be apparent that when golf bags are to be transported in an automobile, such as from the golfer's home to the course, it is undesirable if not impossible for the bags to be stored in an upright position within the vehicle, itself. Generally there is insufficient head room to accommodate such vertical storage. As a consequence, golf bags are often simply put in the trunk or bed of a car, whereupon the bags assume a substantially horizontal position whereby, upon sudden stopping or starting of the vehicle, the clubs loosely maintained within the bag, will shift in their position and often either be partially or wholly ejected from the bag. At a minimum, the clubs will be extended so that all or part of their shafts are without the protection afforded by the bag, and such clubs are subject to injury even in the normal driving process.

It is, therefore, a primary object of the present invention to provide a trunk caddie which will maintain a bag of golf clubs in a secure position within an automobile while the clubs are being transported.

It is a further object of my invention to provide such a caddie which will be inexpensive to make and install, and which will enable the golf bag to be transported at an angle to the horizontal in which the heel of the bag is down, and the mouth of the bag elevated. In such a position, even if clubs within the bag do shift due to the maneuvers of driving an automobile, the clubs within the bag will not be ejected therefrom due to the force of gravity that tends to keep them in the bag.

SUMMARY OF THE INVENTION

The present invention takes the form of an article of manufacture that is made in a single piece. It is formed from a block of resilient yet firm material having a substantially planar bottom for contacting the flat surface of a motor vehicle, e.g., the bed of the trunk or any flat surface within the vehicle that will provide sufficient room. The block of material, in addition to having a substantially flat bottom, has opposed side walls that extend upwardly away from the bottom, and opposed end walls that also so extend, the side and end walls forming between them a block that has a length of dimension defined by the distance between the end walls and a width of dimension defined by the distance between the side walls.

An arcuate depression is formed in the block and extends the width dimension of the block between the opposed side walls. This arcuate depression is bounded downwardly and laterally by an arcuate surface formed in the block, but upwardly it is open in order to receive a golf bag. Further, the arcuate surface intersects the side walls to form substantially similarly shaped arcuate lines of intersection. However, it is a feature of my invention that those arcuate lines of intersection are not substantially parallel to each other, but that one is lower than the other such that the arcuate surface slopes uniformly from the upper line of intersection in one side wall toward the lower line (of intersection) in the other side wall. In this manner when a golf bag is nestled in the arcuate depression, it will be supported therein in a slanted position in which the heel of the bag rests on the flat surface, such as a trunk bed, while a portion of the bag closer to the bag mouth is elevated from the bag heel so that golf clubs protruding from the bag mouth are retained within the bag by virtue of the inclination of the bag from a higher position of the bag mouth to a lower position of the bag heel.

In preferred embodiments of my invention the arcuate depression has a diameter in excess of the diameter of a conventional golf bag in order to enable the golf bag to be retained somewhat securely within the depression. Moreover, I also prefer that at least one, but preferably both of the side walls of my article of manufacture slope inwardly, rather than be maintained in a vertical position. By such slope, those walls form interior angles of less than 90° with the bed of the trunk in the direction of the bag heels. Further, the end walls of the block of the present invention may also slant inwardly as they progress upwardly of the block, but they will terminate short of the arcuate depression, itself. Because of such short termination, the end walls provide for substantially planar block top portions that separate the end walls from the arcuate depression.

In another embodiment, there are a plurality of arcuate depressions formed in the single block that constitutes the article of manufacture of my invention. In this multiple depression block, there are preferably two such depressions, each of which is adapted to hold a golf bag. The depressions may be of the same size, or may be of different sizes, one, for example, being designed to hold a full-size bag and the other to hold a bag of lesser diameter. In this embodiment as well, the arcuate depressions will slope from a higher line of intersection with one side wall toward its opposed, lower side wall line, such that the multiple golf bags that are cradled within the depressions will be mounted on a slope where the mouth of the bag is at a higher level than the heel of the bag, such heel preferably being in contact with the bed of the car trunk. Such slope will not be such that golf clubs protruding from the bag will be brought into contact with the trunk lid; however, it is sufficient such that under normal driving conditions, the force of gravity will tend to keep the clubs safely within the bag despite rigorous maneuvering of the vehicle.

These and other objects, features and advantages of the present invention will be more readily apparent when considered in connection with the following, detailed description of preferred embodiments of my invention, which description is presented in conjunction with the annexed drawings, in which:

BRIEF DESCRIPTION OF THE DRAWINGS

FIG. 2 is a perspective view of a one-cavity block of my invention, generally viewed from one end thereof;

FIG. 3 is another perspective view, partially broken away, showing the embodiment of FIGS. 1 and 2, viewed generally from one side and somewhat above the block, and FIG. 4 is a perspective view of another, two-cavity embodiment of my invention.

DETAILED DESCRIPTION OF PREFERRED EMBODIMENTS

Figure 1:
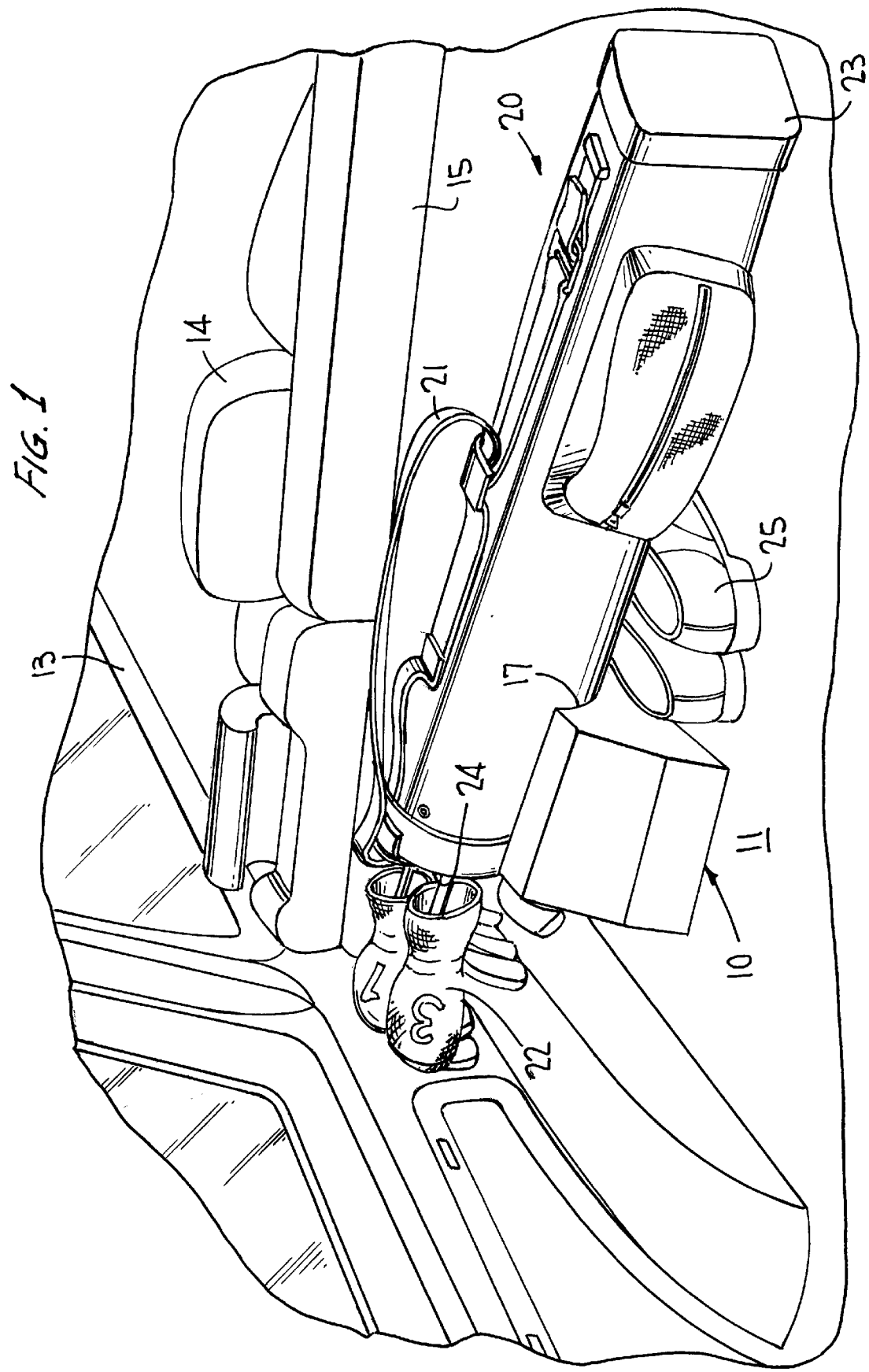
FIG. 1 is a perspective view showing a golf bag mounted for transport on the article of manufacture that constitutes a preferred embodiment of the present invention.

Referring now to the drawings, and first to FIG. 1 thereof, the article of manufacture that constitutes the present invention is there illustrated in typical use. The article or block 10 is mounted with its bottom resting on or adhered to the bed 11 of the trunk of an automobile, with the trunk lid removed. The bed 11 shown in FIG. 1 may also be the rear deck of a station wagon or minivan, or any vehicle that provides sufficient room for a golf bag to be positioned transversely of the vehicle bed. As generally illustrated, the vehicle is an automobile with a frame 13 on which are mounted rear seats 14 having a back rest 15 behind which is positioned the substantially flat bed 11. A golf bag indicated generally by reference numeral 20 is located so that it is cradled within an arcuate depression identified by reference numeral 17 in FIG. 1, formed within the block 10. In this position golf bag 20, with its strap 21 and clubs 22, are inclined upwardly from the heel 23 of the bag toward the bag mouth 24. As shown, a golfer's shoes 25 may conveniently be stowed beneath the space formed by the inclination of the bag 20 from heel 23 up and toward mouth 24.

FIGS. 2 and 3 show a single cavity block according to my invention, i.e., block 10 in which there is a single arcuate depression 17 formed in the block. This will be contrasted with the embodiment illustrated in FIG. 4, in which a two-cavity block is shown.

With respect to a single cavity block, my preferred embodiment is of a unitary article of manufacture having two end walls 30 and 31, and two side walls, 32 and 33. The side walls 32 and 33 are important because they form the portions of the block that bound the arcuate depression 17. Thus, what is termed the width of the block 10 is that portion of the block between what have been designated as lower side wall 33 and higher side wall 32. That designation refers to the lines of intersection that are created where the arcuate depression 17 meets the side walls of the block. As particularly shown in FIGS. 2 and 3, the concavity 17 extends the entire width of the block 10 and creates an arcuate surface 18. That surface intersects higher side wall 32 in an arcuate line of intersection 34 and intersects lower side wall 33 in an arcuate line of intersection 35. Thus, the surface 18 of the concave depression 17 has a uniform slope from one side wall of the block 10 to the other, in this preferred embodiment from what has been designated as higher side wall 32 to lower side wall 33. The designations, higher and lower, refer to the lines of intersection and their relative distance from the bottom 27 of the block 10 to the line of intersection. Bottom 27 is usually substantially flat, although it may be formed to slope at a small angle.

With respect to the end walls 30 and 31, they act to lend bulk and strength to the block, and also serve to maintain a golf bag in its position. It has been found most desirable for the end walls 30 and 31 to slope inwardly toward the concavity although, of course, they do not meet the concavity 17. Thus, end walls 30 and 31 extend upwardly and inwardly toward each other, and their slope changes such that side wall 31 is formed with upper and lower portions 37 and 36, respectively, and side wall 30 with upper and lower portions 39 and 38, respectively. While, in my most preferred embodiment, lower side wall portions 36 and 38 do slant inwardly toward each other, upper end wall portions 37 and 39 slant inwardly toward each other to a greater degree than their lower portions. Because of the change of slope, end wall 31 exhibits a break 41, and end wall 30 is formed with a break 40 that defines the change in slope. In this manner, the block has been designed to provide as much strength as possible to it, and because end walls 30 and 31 do not meet or form part of the concavity 17, their upward extent is spaced from the cavity or arcuate depression 17 by planar portions 44 and 45 that separate the depression 17 from the end walls 30 and 31.

Another feature of my invention relates to the side walls 32 and 33 of the article 10. It is most preferred that one or, preferably two, of those side walls, rather than extending vertically, i.e., at an angle of 90° to the horizontal, extend upwardly but at a slope in the general direction of the slope of the concave depression 17. Thus, lower side wall 33 slopes so that it forms an angle of less than 90° with the bottom 27 of the block and with trunk bed 11. The same is true, in this preferred embodiment, with respect to the slope of side wall 32, i.e., it slopes toward the side wall 33 so that the planes of side walls 32 and 33 intersect each other. Thus, in this preferred embodiment, side walls 32 and 33 each form acute interior angles with the bottom 27 of the block and with any substantially planar surface on which that bottom rests.

With respect to FIG. 4, the embodiment shown therein is intended to be substantially similar to that illustrated in FIGS. 2 and 3, except that there are two concave depressions indicated by arrows 47 rather than the single concavity identified by reference numeral 17 in FIGS. 2 and 3. In the same manner as the embodiment of FIGS. 2 and 3, the FIG. 4 dual concavity article comprises end walls 50 and 51 a higher side wall 52 and a lower side wall 53. Both side walls 52 and 53 slope in the same general direction as the sloping concave depressions 47, and end walls 50 and 51 each have two different slopes to form breaks 56 and 57 that give the appearance of lines extending across the end walls. Since the end walls do not meet either concavity 47, the concavities are separated from the end walls by substantially flat posts 60 and 61 and from each other by post 62.

The article of manufacture according to my invention is in the form of a unitary block of a material that is resilient, yet firm, and therefore which can support the weight of a bag of golf clubs without collapsing, but which will not be so rigid that it will tend to damage the bag when jolts such as are to be expected in the normal driving experience are encountered. Thus, a resilient, yet firm material 65 is desired. See broken away portion of FIG. 3. Natural or synthetic rubber or a synthetic foam, e.g., a polyurethane foam, may be utilized. A wide variety of materials, and particularly thermoplastic resins, will be desirable in use, and the particular material that will be used will be dictated in part by the specific structure to which the article will be adhered, as well as by economics. Thus, the foam or other somewhat resilient material from which the block according to my invention is to be formed, will be adhered to the bed 11 of the trunk of a vehicle, as shown in FIG. 1 of the drawings, although it may simply be left in contact with a bed such as bed 11 and the weight of the golf bag 20 will be sufficient to keep the block 10 from shifting during driving.

Although a block 65 has been illustrated in FIG. 4 as having two concavities 47 of substantially equal size, it will be apparent that those concave depressions may be of different sizes to accommodate golf bags of different sizes, and need not be limited to two concave depressions, but that the depressions may be utilized in such number as will accommodate all the golf bags of a family on a golf outing.

It will be apparent to those of ordinary skill in this art and, indeed, to the general sporting public, that certain modifications and alterations, such as those stated hereinbefore, may be made in the preferred embodiments of the present invention shown and described herein without the use of inventive skill. As to all such modifications and alterations as would be obvious to such persons, it is desired that they be included within the purview of my invention, which is to be limited only by the scope, including equivalents, of the following, appended claims.

What is claimed is:

1. A unitary article of manufacture for storing on a substantially flat surface a golf bag having an opposed bag mouth and heel in a position in which clubs extending from said bag mouth will be retained therein against accidental ejection therefrom, comprising a unitary, solid block of resilient yet firm material having a substantially planar bottom for contacting said substantially flat surface, opposed end walls extending upwardly away from said bottom, and opposed side walls also extending upwardly away from said bottom, said end walls and said side walls forming said block between them, said block having a length dimension defined by said end walls and a width dimension defined by said side walls, and an arcuate depression formed in said block and extending the width dimension of said block between said opposed side walls, said depression being bounded downwardly and laterally by an arcuate surface and upwardly being open to receive said golf bag, said arcuate surface intersecting said side walls to form substantially similarly shaped arcuate lines of intersection in each of said side walls, said line of intersection in one of said side walls being closer to said bottom of said article than said line of intersection in the other of said side walls so that said arcuate surface is inclined toward a lower one of said side walls from a higher one of said side walls, whereby a golf bag nestled in said arcuate depression will be supported therein with said bag heel resting on said substantially flat surface and a portion of said bag closer to said bag mouth is cradled by said arcuate surface on a slope in which said bag mouth is inclined upwardly away from said bag heel and golf clubs protruding from said bag mouth are retained within said bag by virtue of said inclination thereof.

2. A unitary article as claimed in claim 1, in which said arcuate depression has a diameter in excess of the diameter of a conventional golf bag.

3. A unitary article as claimed in claim 1, in which said block lower side wall extends upwardly from said block bottom at an interior angle of less than 90 degrees.

4. A unitary article as claimed in claim 1, in which said block higher side wall extends upwardly from said block bottom at an exterior angle of more than 90 degrees.

5. A unitary article as claimed in claim 1, in which both of said block side walls extend upwardly from said block bottom at interior angles of less than 90 degrees.

6. A unitary article as claimed in claim 5, in which both of said block side walls extend upwardly at the same angle.

7. An article as claimed in claim 1, in which said block end walls extend upwardly and inwardly of said block in the direction of said arcuate depression.

8. An article as claimed in claim 7, in which said end walls terminate upwardly short of said arcuate depression.

9. An article as claimed in claim 8, in which said side walls form substantially planar block top portions between said end walls and said arcuate depression.

10. An article as claimed in claim 7, in which said end walls extend inwardly toward each other at a first angle to the horizontal for an initial part of their height from said bottom, and then toward each other at a second angle to the horizontal for a later part of their height, said first angle being substantially greater than said second angle.

11. An article as claimed in claim 10, in which each of said end walls exhibits a well-defined break in their surfaces where said initial part and said later part meet.

12. A unitary article of manufacture for storing on a substantially flat surface a plurality of golf bags having opposed bag mouths and heels in a position in which clubs extending from said bag mouths will be retained therein against accidental dislodgment therefrom, comprising, a unitary, solid block of resilient yet firm material having a substantially planar bottom for contacting said substantially flat surface, opposed end walls extending upwardly away from said bottom, and opposed side walls also extending upwardly away from said bottom, said end walls and said side walls forming said block between them, said block having a length dimension defined by said end walls and a width dimension defined by said side walls, and a plurality of arcuate depressions formed in said block and extending the width dimension of said block between said opposed side walls, said depressions being bounded downwardly and laterally by arcuate surfaces and upwardly being open to receive said golf bags, said arcuate surfaces intersecting said side walls to form substantially similarly shaped arcuate lines of intersection in each of said side walls, said lines of intersection in one of said side walls being closer to said bottom of said article than said lines of intersection in the other of said side walls so that said arcuate surface is inclined toward a lower one of said side walls from a higher one of said side walls, whereby a plurality of golf bags nestled in said arcuate depressions will be supported therein with said bag heels resting on said substantially flat surface and portions of said bags closer to said bag mouths cradled by said arcuate surfaces on a slope in which said bag mouths are inclined upwardly away from said bag heels and golf clubs protruding from said bag mouths are retained within said bags by virtue of said inclination thereof.

13. A unitary article as claimed in claim 12, in which said arcuate depressions have diameters in excess of the diameters of conventional golf bags.

14. A unitary article as claimed in claim 13, in which said arcuate depressions have different diameters suitable for accommodating golf bags of different diameters.

15. A unitary article as claimed in claim 12, in which said block lower side wall extends upwardly from said block bottom at an interior angle of less than 90 degrees.

16. A unitary article as claimed in claim 12, in which both said block side walls extend upwardly from said block bottom at interior angles of less than 90 degrees.

17. An article as claimed in claim 12, in which said block end walls extend upwardly and inwardly of said block in the direction of said arcuate depressions.

18. An article as claimed in claim 17, in which said end walls terminate upwardly short of said arcuate depressions and form substantially planar block top portions between said end walls and said arcuate depressions and between each of said arcuate depressions.

\* \* \* \* \*